UNITED STATES PATENT OFFICE.

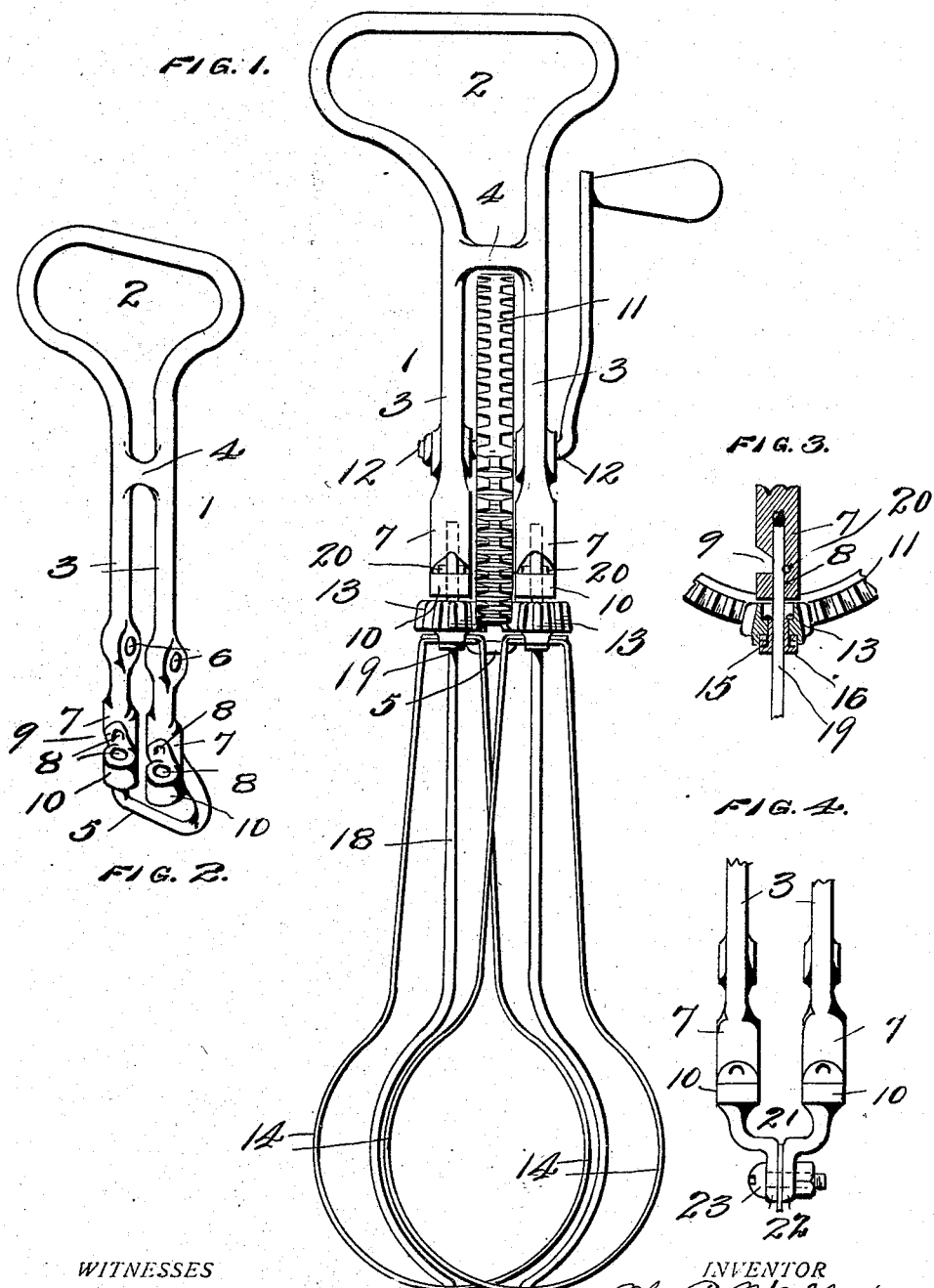

HARLAN P. WELLS, OF AMESBURY, MASSACHUSETTS.

EGG AND OTHER BEATER.

No. 905,036.     Specification of Letters Patent.    Patented Nc 24, 1908.

Application filed June 1, 1908. Serial No. 436,184.

*To all whom it may concern:*

Be it known that I, HARLAN P. WELLS, a citizen of the United States, residing at Amesbury, in the county of Essex and State of Massachusetts, have invented new and useful Improvements in Egg and other Beaters, of which the following is a specification.

The object of my invention is the provision of a beater for eggs, and for use in reducing to uniform consistency any liquid or semi-liquid or other substance, or mixing a plurality of substances, said beater to be so constructed that the gear wheels will be balanced and thus not be liable to become displaced one relative to the other, causing uneven wear, wabbling and the derangement of the parts.

A further object is the provision of a frame for the gear wheels of relatively great strength and light weight which will be durable and retain its shape as long as the movable parts of the device shall be capable of operation.

With these main ends in view, my invention consists in certain novelties of construction and combinations of parts as hereinafter set forth and claimed.

The accompanying drawing illustrates the beater constructed according to the best mode I have so far devised for the application of the principle.

Figure 1 is a view in elevation of the entire beater. Fig. 2 is a view of the frame which supports the gear wheels and shafts. Fig. 3 is a section through one of the small gear wheels. Fig. 4 shows a modification of the lower part of the frame.

Referring to the several figures, the numeral 1 designates the frame of the device as a whole; 2, a handle or loop at the end; 3, the two arms of the frame; 4, a top bar uniting the arms; 5, a bottom bar uniting the arms, the same extending below the ends of the arms to afford sufficient open space between the arms for a main gear wheel; 6, perforations in the arms to receive a shaft; 7, the enlarged lower ends of the arms; 8, longitudinal perforations in the arms; 9, recesses in the arms; 10, top bearing surfaces for the small gear wheels; 11, the large gear wheel having teeth upon each side of the rim; 12, the crank shaft located within the bearings in the frame and supporting the large gear wheel which is keyed or otherwise fixed upon the shaft; 13, the small perforated gear wheels; 14, the beater blades, each made by bending a flat metallic bar upon itself to a semicircular shape at the middle portion and the free ends bent over each other at right angles; 15, holes through the free ends; 16, a hollow flanged rivet passed through the hole 15 and its end upset or otherwise secured within the perforation through a small gear wheel; 17, holes at the lower ends of the beater blades; 18, a wire bent upon itself at its middle portion and the parallel arms passed through the holes 17 in the lower ends of the beater; 19, the ends of the wire passed through the hollow rivets within the small gear wheels and their free ends adjustably located within the longitudinal perforations 8 in the arms of the frame; 20, a clamping pin for each wire inserted within the open space between the wire and the metal bounding a recess 9 in an arm of the frame; 21, in Fig. 4 the bottom bar 5 made in two parts with perforated extensions 22, one of them being interiorly threaded; and 23 is a threaded screw by which the arms of the frame may be forced towards each other and the small gear wheels brought into closer mesh with the large gear wheel.

As is well known, the common type of egg beater has the main gear wheel located outside the two small gear wheels, which are in mesh, and engages only one of them. The main gear wheel shaft also has a single support. The gears are thus out of balance and, after being used a short time, the main gear wheel wabbles so that it skips some of the teeth on the small wheel, runs hard and causes excessive wear of all the movable parts.

In my improved gearing the main shaft is supported in the arms each side of the main gear wheel, the ends of the arms 3 each has an enlarged bearing 10 for a small gear wheel, the teeth of the main gear wheel accurately intermesh with the teeth of the small gear wheels between which the rim is located, and the bottom bar 5 prevents any separation of the arms which would displace the small gear wheels. When the bar 5 shown by Fig. 4 is used the wear of the gears can be taken up. Moreover, the adjustable ends of the wire shafts about which the small gear wheels revolve insures a close frictional contact of the said wheels with the bearings 10 at the ends of the arms. It thus becomes clear that I have provided a beater in which the gearing is balanced, which will not wear unevenly, which will not wabble, and one which will continue operative for a very long period of time.

What I claim is:

1. The combination in a beater comprising a frame with a handle, arms with perforations for a crank shaft and longitudinally perforated at the ends, a top cross bar, a bottom cross bar, and bearings at the ends of the arms, of a wire 18 with its ends adjustably located within the longitudinal perforations at the ends of the arms of the frame; beater blades each having a small gear wheel adapted to rotate about the end of the wire 18 as a shaft; a crank shaft journaled in the perforations in the arms; and a main gear wheel upon the shaft located between the arms, and its rim having teeth upon opposite sides and in mesh with the two small gear wheels.

2. The combination in a beater, of a frame with a handle, two substantially parallel arms perforated for a crank shaft, longitudinally perforated at the ends, and having a cross bar at the ends of the arms, of a crank shaft journaled in the arms; a main gear wheel with its rim provided with teeth on opposite sides mounted upon the crank shaft and between the arms; and two small gear wheels carrying beater blades journaled upon shafts supported within the perforations at the ends of the arms, said small gear wheels being located at the ends of the arms and upon opposite sides of the main gear wheel rim.

3. The combination in a beater and with two beater blades having small gear wheels at their ends, of a frame with two parallel arms united by a cross bar; a main gear wheel supported on a crank shaft between the arms and having its rim provided with teeth upon opposite sides in gear with the two small gear wheels; said small gear wheels being journaled at the ends of the arms.

4. The combination in a beater and with two beater blades having small gear wheels at their ends, of a frame with two parallel arms united by an adjustable cross bar; a main gear wheel supported on a crank shaft between the arms and having its rim provided with teeth upon opposite sides in gear with the two small gear wheels; said small gear wheels being journaled at the ends of the arms.

5. The combination with a beater having a frame with arms united at their ends, and beater blades with small gear wheels journaled at the ends of the arms, of a main gear wheel with its rim provided with teeth upon opposite sides intermeshing with the small gear wheels; said main gear wheel being located between the arms of the frame and upon a crank shaft.

In testimony whereof I affix my signature in presence of two witnesses.

HARLAN P. WELLS.

Witnesses:
GEORGE L. BRIGGS,
ADDIE L. TRUE.